(12) United States Patent
Johnson

(10) Patent No.: US 7,040,337 B1
(45) Date of Patent: May 9, 2006

(54) VALVE OVERRIDE SYSTEM

(76) Inventor: Michael Johnson, 753 Classon Ave Apt L D, Brooklyn, NY (US) 11238

( * ) Notice: Subject to any disclaimer, the term of this patent is extended or adjusted under 35 U.S.C. 154(b) by 43 days.

(21) Appl. No.: 10/782,064

(22) Filed: Feb. 19, 2004

(51) Int. Cl.
*F16K 3/00* (2006.01)

(52) U.S. Cl. ............... 137/15.17; 137/15.08; 137/15.23; 251/264; 251/326

(58) Field of Classification Search ............ 137/15.01, 137/15.08, 15.12, 15.17, 15.18, 15.23, 15.24; 251/264, 326–329
See application file for complete search history.

(56) References Cited

U.S. PATENT DOCUMENTS

| 997,038 | A | * | 7/1911 | Brummer ................. 137/495 |
| 1,675,986 | A | * | 7/1928 | Lyall ...................... 251/327 |
| 1,753,524 | A | * | 4/1930 | Mawby ................... 251/264 |
| 2,843,152 | A | * | 7/1958 | Laird et al. .............. 137/797 |
| 2,930,577 | A | * | 3/1960 | Bredtschneider et al. ... 251/200 |
| 3,583,416 | A | | 6/1971 | Nebesnik et al. |
| 4,205,704 | A | * | 6/1980 | Benson ................ 137/630.12 |
| 4,230,299 | A | * | 10/1980 | Pierce, Jr. ................ 251/14 |
| 5,320,003 | A | | 6/1994 | Ely et al. |
| 6,244,138 | B1 | | 6/2001 | Campbell |

* cited by examiner

*Primary Examiner*—J. Casimer Jacyna

(57) ABSTRACT

A valve override system for allowing a user to restore flow through a gate valve that has failed in the closed position. The valve override system includes an engagement assembly being designed for engaging a gate of the gate valve assembly whereby the engagement assembly is for urging the gate of the gate valve assembly into an open position to allow fluid to pass through the gate valve assembly.

2 Claims, 2 Drawing Sheets

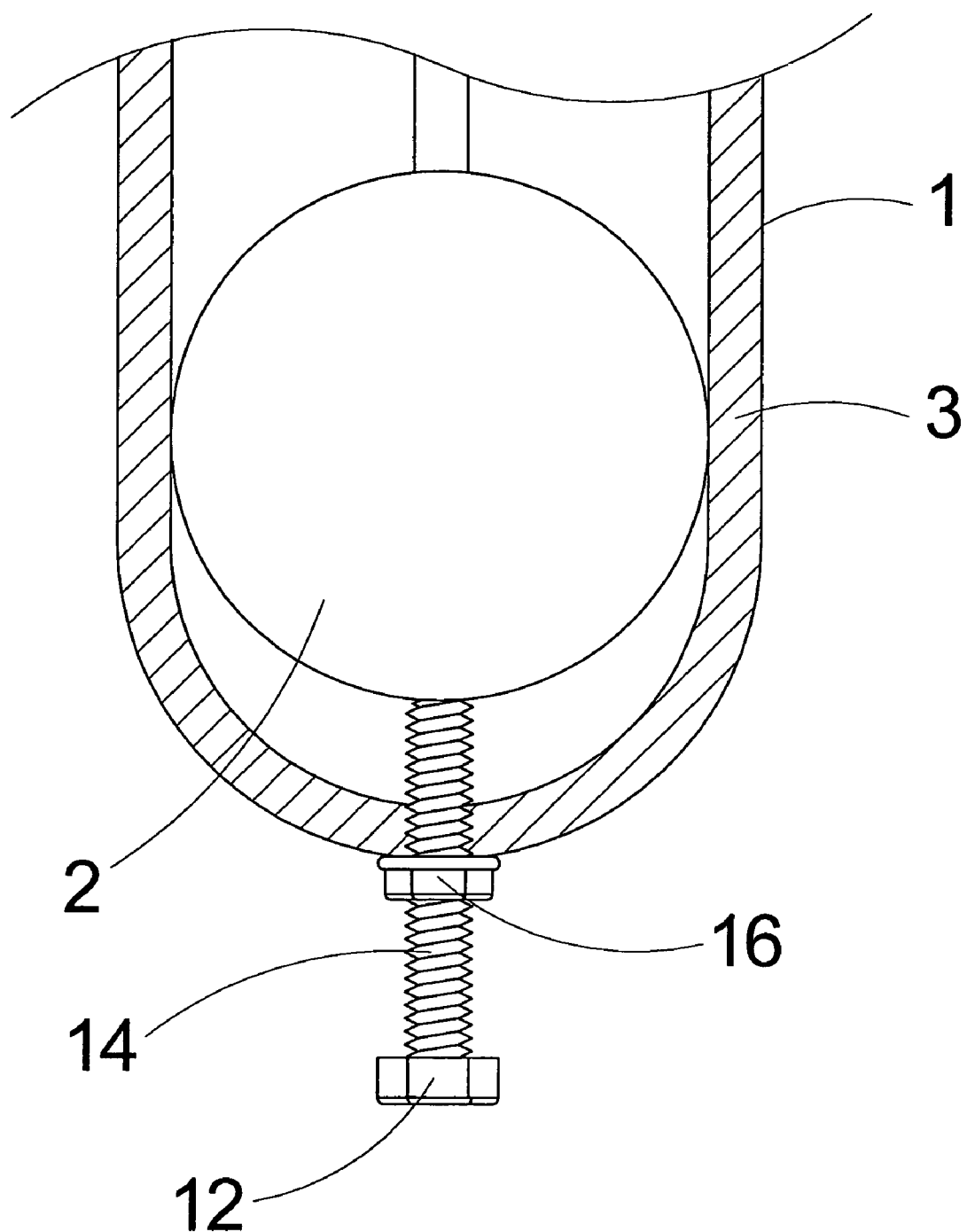

VALVE OVERRIDE SYSTEM

BACKGROUND OF THE INVENTION

1. Field of the Invention

The present invention relates to valve wrenches and more particularly pertains to a new valve override system for allowing a user to restore flow through a gate valve that has failed in the closed position.

2. Description of the Prior Art

The use of valve wrenches is known in the prior art. U.S. Pat. No. 5,320,003 describes a device for actuating underground valves to open or close the underground valves. Another type of valve wrench is U.S. Pat. No. 6,244,138 having a device for assisting in the open and closing of a valve and absorbs the shock from opening and closing the valve. U.S. Pat. No. 3,583,416 has a stem assembly that can be selectively removed when the valve stem has failed and is easily replaced with a new valve stem assembly.

While these devices fulfill their respective, particular objectives and requirements, the need remains for a system that has certain improved features that allows a user to open a gate valve that is stuck in a closed position.

SUMMARY OF THE INVENTION

The present invention meets the needs presented above by providing an engagement means that engages the gate of the gate valve assembly and urges the gate into the open position when the valve stem has failed and can no longer be used to operate the gate of the gate valve assembly.

Still yet another object of the present invention is to provide a new valve override system that allows a user to quickly restore flow through a failed gate valve to allow users to continue use of the fluid flowing through the gate valve.

Even still another object of the present invention is to provide a new valve override system that reduces the amount of time that a system is down due to a failure in a gate valve.

To this end, the present invention generally comprises an engagement means being designed for engaging a gate of the gate valve assembly whereby the engagement means is for urging the gate of the gate valve assembly into an open position to allow fluid to pass through the gate valve assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross-sectional view of the present invention taken along line 2—2 of FIG. 1.

DESCRIPTION OF THE PREFERRED EMBODIMENT

Figure 1:
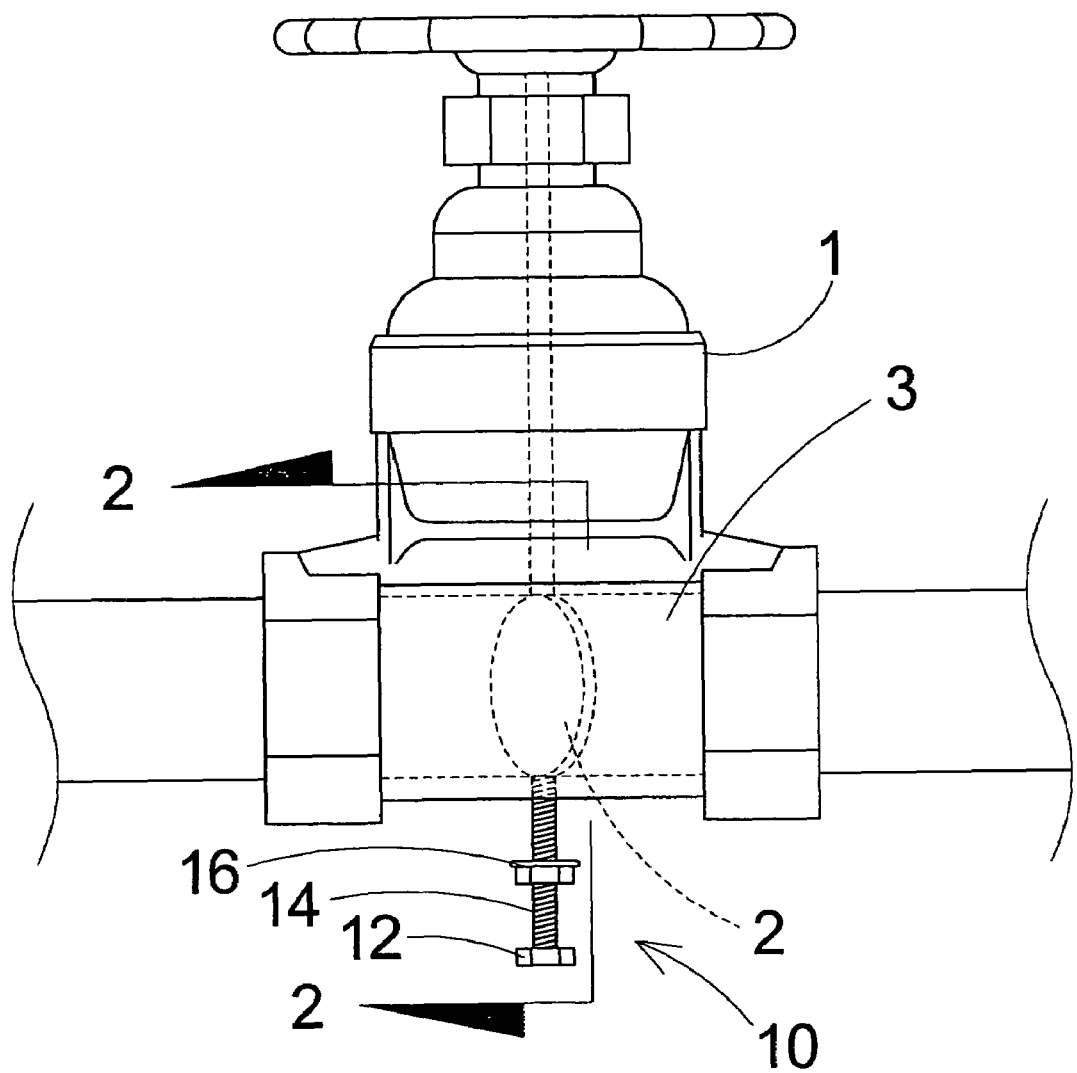
FIG. 1 is a front view of a new valve override system according to the present invention.

With reference now to the drawings, and in particular to FIGS. 1 and 2 thereof, a new valve override system embodying the principles and concepts of the present invention and generally designated by the reference numeral 10 will be described.

As best illustrated in FIGS. 1 and 2, the valve override system 10 generally comprises an engagement means 12 being designed for engaging a gate 2 of the gate valve assembly 1 whereby the engagement means 12 is for urging the gate 2 of the gate valve assembly 1 into an open position to allow fluid to pass through the gate valve assembly 1.

The engagement means 12 comprises a rigid elongate 2 member 14. The rigid elongate 2 member 14 is designed for extending through a casing 3 of the gate valve assembly 1 whereby the rigid elongate 2 member 14 engages a bottom edge of the gate 2 of the gate valve assembly 1.

The rigid elongate 2 member 14 having threads. The threads of the rigid elongate 2 member 14 are designed for threadably engaging the casing 3 of the gate valve assembly 1. The rigid elongate 2 member 14 is designed for being rotated with respect to the casing 3 of the gate valve assembly 1 for changing the length of the rigid elongate 2 member 14 positioned in the gate valve assembly 1 to actuate the gate 2 of the gate valve assembly 1. The rigid elongate 2 member 14 may comprise a ¼ inch threaded bolt having a length of about 2-½ inches.

An inhibiting member 16, such as a packing nut, is designed for selectively engaging the casing 3 of the gate valve assembly 1. The inhibiting member 16 is designed for inhibiting environmental communication between an interior space of the gate valve assembly 1 and an external environment.

The inhibiting member 16 is operationally coupled to the rigid elongate 2 member 14. The inhibiting member 16 is designed for abutting the casing 3 of the gate valve assembly 1 to inhibit environmental communication through the casing 3 adjacent the rigid elongate 2 member 14.

The inhibiting member 16 is threaded. The threads of the inhibiting member 16 threadably engage the rigid elongate 2 member 14 whereby the inhibiting member 16 engages the casing 3 of the gate valve assembly 1 to preload the rigid elongate 2 member 14 and inhibit the rigid elongate 2 member 14 from inadvertently separating from the gate valve assembly 1.

In use, the user drills a hole through the casing 3 of the gate valve assembly 1 opposite a valve stem of the gate valve assembly 1. The hole drilled into the casing 3 of the gate valve assembly 1 is tapped to provide the hole with threads. The inhibiting member 16 is threaded onto the rigid elongate 2 member 14. The rigid elongate 2 member 14 is threaded into the hole drilled into the casing 3 of the gate valve. The rigid elongate 2 member 14 is rotated with respect to the gate valve assembly 1 to advance the rigid elongate 2 member 14 into the gate valve assembly 1 and urge the gate 2 into the open position. The inhibiting member 16 is tightened against the casing 3 of the gate valve assembly 1 to inhibit environmental communication between the interior space of the gate valve assembly 1 and the environment and inhibiting inadvertent rotation of the rigid elongate 2 member 14 with respect to the gate valve assembly 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of opening a closed gate valve comprising: providing a valve override system comprising:
   an engagement means being adapted for engaging a gate of the gate valve assembly such that said engagement means is for urging the gate of the gate valve assembly into an open position to allow fluid to pass through the gate valve assembly;
   said engagement means comprising a rigid elongate member, said rigid elongate member being adapted for extending through a casing of the gate valve assembly such that said rigid elongate member engages a bottom edge of the gate of the gate valve assembly;
   said rigid elongate member having threads, said threads of said rigid elongate member being adapted for threadably engaging the casing of the gate valve assembly, said rigid elongate member being adapted for being rotated with respect to the casing of the gate valve assembly for changing the length of said rigid elongate member positioned in the gate valve assembly to actuate the gate of the gate valve assembly;
   an inhibiting member being adapted for selectively engaging the casing of the gate valve assembly, said inhibiting member being adapted for inhibiting environmental communication between an interior space of the gate valve assembly and an external environment;
   said inhibiting member being operationally coupled to said rigid elongate member, said inhibiting member being adapted for abutting the casing of the gate valve assembly to inhibit environmental communication through the casing adjacent said rigid elongate member;
   said inhibiting member being threaded, said threads of said inhibiting member threadably engaging said rigid elongate member such that said inhibiting member engages the casing of the gate valve assembly to preload said rigid elongate member and inhibit said rigid elongate member from inadvertently separating from the gate valve assembly;
   drilling a hole through the casing of the gate valve assembly opposite a valve stem of the gate valve assembly;
   tapping the hole of the gate valve assembly to provide the hole with threads;
   threading said inhibiting member onto said rigid elongate member;
   threading said rigid elongate member into the hole drilled into the casing of the gate valve;
   rotating said rigid elongate member with respect to the gate valve assembly to advance said rigid elongate member into the gate valve assembly and urge the gate into the open position; and
   tightening of the inhibiting member against the casing of the gate valve assembly to inhibit environmental communication between the interior space of the gate valve assembly and the environment and inhibiting inadvertent rotation of said rigid elongate member with respect to the gate valve assembly.

2. A method of opening a closed gate valve comprising: providing a valve override system comprising:
   a rigid elongate member for engaging a gate of the gate valve assembly, said rigid elongate member having threads; and
   an inhibiting member having interior threads for selectively engaging the exterior threads of the rigid elongate member;
   forming a hole through a casing of a gate valve assembly at a location opposite of a valve stem of the gate valve assembly;
   tapping the hole of the gate valve assembly to provide the hole with threads;
   threading said inhibiting member onto said rigid elongate member;
   threading said rigid elongate member into the hole drilled into the casing of the gate valve assembly;
   rotating said rigid elongate member with respect to the gate valve assembly to advance said rigid elongate member into the gate valve assembly and to contact the gate to thereby urge the gate into an open position; and
   tightening of the inhibiting member against the casing of the gate valve assembly to inhibit environmental communication between the interior space of the gate valve assembly and the environment of the gate valve assembly and to inhibit inadvertent rotation of said rigid elongate member with respect to the gate valve assembly.

* * * * *